US012681892B2

(12) United States Patent
Salinas Hernando et al.

(10) Patent No.: US 12,681,892 B2
(45) Date of Patent: Jul. 14, 2026

(54) MULTI-CORE SYSTEM-ON-CHIP

(71) Applicant: Rockwell Collins, Inc., Cedar Rapids, IA (US)

(72) Inventors: Gonzalo Salinas Hernando, Cork City (IE); Alejandro Garcia Gener, Cork (IE); Fabio Federici, Tornimparte (IT)

(73) Assignee: Rockwell Collins, Inc., Cedar Rapids, IA (US)

( * ) Notice: Subject to any disclaimer, the term of this patent is extended or adjusted under 35 U.S.C. 154(b) by 102 days.

(21) Appl. No.: 18/671,588

(22) Filed: May 22, 2024

(65) Prior Publication Data

US 2024/0394217 A1 Nov. 28, 2024

(30) Foreign Application Priority Data

May 23, 2023 (EP) ..................................... 23174969

(51) Int. Cl.
*G06F 15/78* (2006.01)
*G06F 13/40* (2006.01)

(52) U.S. Cl.
CPC ...... *G06F 15/7821* (2013.01); *G06F 13/4068* (2013.01)

(58) Field of Classification Search
CPC ............. G06F 15/7821; G06F 13/4068; G06F 11/1695; G06F 11/1629; G06F 11/1641
See application file for complete search history.

(56) References Cited

U.S. PATENT DOCUMENTS

| | | | |
|---|---|---|---|
| 9,611,033 B1* | 4/2017 | Kovalan | ................ B64C 19/00 |
| 10,353,767 B2 | 7/2019 | Gianisis et al. | |
| 11,275,709 B2 | 3/2022 | Tamir et al. | |
| 11,546,189 B2 | 1/2023 | Sindhu et al. | |
| 2002/0144177 A1* | 10/2002 | Kondo | ................ G06F 11/1441 |
| | | | 714/13 |

(Continued)

FOREIGN PATENT DOCUMENTS

WO 2015096001 A1 7/2015

OTHER PUBLICATIONS

Extended European Search Report dated Feb. 19, 2024; European Application No. 23174969.8.

(Continued)

*Primary Examiner* — Emerson C Puente
(74) *Attorney, Agent, or Firm* — Suiter Swantz IP

(57) ABSTRACT

A system-on-chip may include a first core having a first processor architecture and a second core having a different second processor architecture. The system-on-chip may include a shared bus communicatively coupled to the cores and a shared memory communicatively coupled to the shared bus, for storing shared data accessible by cores. A hardware comparison module may be configured to compare first data and second data to detect an inconsistency between the first data and the second data, and to signal when an inconsistency is detected. A first comparison-data bus may be communicatively coupled to the first core and to the comparison module, and arranged to provide the first data to the hardware comparison module. A second comparison-data bus may be communicatively coupled to the second core and to the comparison module, and arranged to provide the second data to the comparison module.

15 Claims, 3 Drawing Sheets

(56)                    References Cited

U.S. PATENT DOCUMENTS

| | | | | |
|---|---|---|---|---|
| 2009/0327818 | A1* | 12/2009 | Kogelnik | G06F 21/602 |
| | | | | 714/49 |
| 2016/0283438 | A1* | 9/2016 | Chen | G06F 15/80 |
| 2017/0227981 | A1* | 8/2017 | Yuyama | H04L 12/5601 |
| 2019/0079826 | A1* | 3/2019 | Gianisis | G06F 11/0721 |
| 2020/0364088 | A1 | 11/2020 | Ashwathnarayan et al. | |
| 2023/0168978 | A1* | 6/2023 | Ulman | G06F 11/0793 |
| | | | | 714/4.1 |

OTHER PUBLICATIONS

Rodrigues Cristiano et al: "Towards a Heterogeneous Fault-Tolerance Architecture based on Arm and RISC-V Processors", IECON 2019, 45th Annual Conference of the IEEE Industrial Electronics Society, IEEE, vol. 1, Oct. 14, 2019, pp. 3112-3117.

* cited by examiner

MULTI-CORE SYSTEM-ON-CHIP

CROSS-REFERENCE TO RELATED APPLICATIONS

The present application claims the benefit of European Patent Application No. 23174969.8, entitled Multi-Core System-on-chip, filed May 23, 2023, which is incorporated herein by reference in the entirety.

FIELD

The present disclosure relates to a multi-core system-on-chip.

BACKGROUND

Multi-core System-on-Chips (SoCs) are integrated circuits that contain two or more processor cores. The cores typically execute different software from each other, but can access shared resources such as shared memory and shared peripherals.

Some multi-core SoCs can advantageously be used to improve safety, e.g., in safety-critical contexts such as in aviation, by being used to execute the same software algorithm on two different cores. If the results from the two cores are compared, it can be possible to detect if the SoC is operating normally, or if a fault has occurred in which case appropriate action can be taken, thereby enhancing safety.

However, if a fault affects both cores such that both cores output the same erroneous data, this will not be detected, and could still lead to a dangerous situation arising.

It is therefore desired to provide an improved approach.

SUMMARY

The disclosure provides a system-on-chip comprising: a first core having a first processor architecture; a second core having a second processor architecture, different from the first processor architecture; a shared bus, communicatively coupled to the first core and to the second core; a shared memory, communicatively coupled to the shared bus, for storing shared data accessible by the first core and by the second core over the shared bus; a hardware comparison module, comprising circuitry configured to compare first data, determined by one or more operations of the first core, and second data, determined by one or more operations of the second core, to detect an inconsistency between the first data and the second data, and to signal when an inconsistency is detected; a first comparison-data bus, communicatively coupled to the first core and to the comparison module, and arranged to provide the first data to the comparison module, where the first comparison-data bus is isolated from the shared bus; and a second comparison-data bus, communicatively coupled to the second core and to the comparison module, and arranged to provide the second data to the comparison module, where the second comparison-data bus is isolated from the shared bus and from the first comparison-data bus.

By having cores of different architectures—e.g., a RISC-V instruction-set architecture and an Arm instruction-set architecture, respectively—the likelihood of a fault arising that affects both cores similarly may be reduced. Additionally, the comparison module being arranged to receive the data, determined by the two cores, over two different respective comparison-data buses, which are isolated from each other and from the shared bus, means that a fault, that corrupts the data received by the comparison module from one of the cores, is very unlikely also to similarly corrupt the data received by the comparison module from the other core, which might otherwise result in the comparison module not detecting an inconsistency. This use of different processor architectures and isolated comparison-data buses may therefore result in a low risk of a fault arising that cannot be detected by the comparison module. This may improve robustness against unintentional software or hardware faults. It may also provide resistance against faults deliberately caused by a malicious attacker.

The cores may have any different architectures, but in some examples the first core has a RISC-V instruction-set architecture and the second core has an Arm instruction-set architecture. The first core may be an RISC-V core, such as a Rocket core. The second core may be an Arm core, such as a Cortex-M microcontroller.

The first comparison-data bus may be inaccessible to the second core. The second comparison-data bus may be inaccessible to the first core.

The first and second core may be directly coupled to the shared bus. However, in some examples, the shared bus is a shared memory bus and the SoC further comprises a first system bus between the first core and the shared memory bus and/or a second system bus between the second core and the shared memory bus. The first system bus may be isolated from the second system bus. The first system bus may be inaccessible to the second core, and the second system bus may be inaccessible to the first core. This provision of isolated system buses for the respective cores may further reduce the risk of a fault arising that affects both cores similarly and may provide an extra security layer from a hardware perspective, so that the first core cannot access data on the second core and vice versa.

The SoC may comprise one or more peripherals that are accessible only to the first core or only to the second core. In some examples, such a peripheral may be coupled to the first system bus or to the second system bus. This isolation of peripherals may help prevent a fault spreading between the cores via the peripherals.

Any one or more, or all, of the shared bus, the first comparison-data bus, the second comparison-data bus, or—where present—the first system bus, or the second system bus, may implement a respective bus protocol supported by the first core. In examples where the first architecture is a RISC-V instruction-set architecture, any one or more, or all, of these buses may be a respective TileLink bus.

The SoC may comprise a respective bridge module arranged between the second core and each of one or more of these buses, where the bridge module is configured to translate between a bus protocol supported by the second core and a bus protocol supported by the respective bus. In particular, the SoC may have a comparison-data bridge module between the second core and the second comparison-data bus. The second data may pass through this bridge module, or the comparison-data bridge module may be configured to receive data from the second core and to generate the second data from the received data and to output the second data onto the second comparison-data bus. The second comparison-data bus may be connected only to the bridge and to the comparison module (i.e., having no connections to any other components of the SoC). In examples where the second architecture is an Arm architecture, each such bridge may be configured to translate between an Arm bus protocol, such as Advanced High-performance Bus (AHB), and a TileLink bus protocol. The comparison-data bridge module may be arranged to present a memory-mapped interface to the second core.

The comparison module may be arranged to present a memory-mapped interface to the second core or comparison-data bridge module, and may be arranged to receive the second data from the second comparison-data bus through the memory-mapped interface.

The SoC may further comprise a hardware accelerator module arranged between the first core and the first comparison-data bus, comprising circuitry configured to receive commands from the first core over a hardware-accelerator (i.e. coprocessor) interface, and to output the first data onto the first comparison-data bus. The first comparison-data bus may be connected only to the hardware accelerator module and to the comparison module (i.e. having no connections to any other components of the SoC). In examples where the first core is a RISC-V Rocket core, the hardware accelerator module may be configured to present a Rocket Custom Coprocessor (RoCC) interface to the first core. The hardware accelerator module may be configured to receive data from the first core (e.g. by retrieving data from a cache memory of the first core). The received data may be the first data, or the hardware accelerator module may be configured to generate the first data from the received data. The accelerator module may be configured to output the first data in response to a command from the first core, received by the accelerator module over the hardware-accelerator interface.

In some examples, the first core uses a hardware-accelerator (i.e., coprocessor) interface provided by the hardware accelerator module to cause the first data to be received by the comparison module, and the second core uses a memory-mapped interface provided by the comparison-data bridge module to cause the second data to be received by the comparison module. The use of two different interface mechanisms for the two cores provides additional diversity which may provide further resilience against faults.

The comparison module may be configured to detect an inconsistency between the first data and the second data when the first data (or a hash thereof) differs from the second data (or a hash thereof) in more than a threshold number, or threshold percentage, of bit positions. In some examples, the threshold is zero, such that an inconsistency is detected if the first data is not equal to the second data. In some examples, the threshold may be configurable at boot level to have a desired value. It may then be fixed until the next boot. Setting the threshold at boot may ensure that any malicious attacks cannot modify the threshold while the SoC is running.

The first data, received by comparison module, may be data output from the first core, or it may be derived from data output from the first core. In some examples, the first data is a hash of data that has been output from the first core. In examples having a hardware accelerator module, the hardware accelerator module may comprise hashing circuitry configured to receive data from the first core and to hash the received data to generate the first data. In other examples, the first core may be arranged to execute software for hashing data generated by the first core and for outputting the first data as hashed data. In other examples, the first data may be data output by the first core and the hardware comparison module may comprise hashing circuitry configured to hash the first data when comparing the first data and the second data (which may already be hashed, in some examples) to detect an inconsistency.

The second data, received by comparison module, may be data output from the second core, or it may be derived from data output from the second core. In some examples, the second data is a hash of data that has been output from the second core. In examples having a comparison-data bridge module, the comparison-data bridge module may comprise hashing circuitry configured to receive data from the second core and to hash the received data to generate the second data. In other examples, the second core may be arranged to execute software for hashing data generated by the second core and for outputting the second data as hashed data. In other examples, the second data may be data output by the second core and the hardware comparison module may comprise hashing circuitry configured to hash the second data when comparing the first data (which may already be hashed, in some examples) and the second data to detect an inconsistency.

In some examples, the first data is a hash of data that has been generated by the first core and the second data is a hash of data that has been generated by the second core. In some examples, the first data is a hash of data output by the first core (e.g., calculated by the hardware comparison module from unhashed data output by the first core) and the second data is a hash of data output by the second core (e.g. calculated by the comparison-data bridge module from unhashed data output by the second core). However, in others examples, one of the cores may output data that is hashed by hashing circuitry on the SoC while the other core outputs hashed data that has been hashed by software executing on the core.

Detecting inconsistencies using hashed data may allow the efficient hardware comparison module to be more efficient, e.g. by reducing storage requirements and/or by enabling the comparison to be performed on data of equal lengths (e.g., of a predetermined hash length). The hash may be a checksum or a cryptographic hash. In some examples, it is a SHA3 hash.

The first and second data may be determined by any appropriate operations of the respective cores. The data may comprise the result of a calculation (e.g., a matrix multiplication) or may comprise data from a sensor or any other data. In some examples, it may be determined based on shared data stored in the shared memory and accessed by both cores. The first data may be determined by first software executing on the first core, and the second data may be determined by second software executing on the second core. The first and second software may comprise instructions for performing a same algorithm, but assembled differently according to the different respective processor architectures. The software may be stored in one or more memories of the SoC. The cores may execute the algorithm at least partly overlapping in time. The first data and the second data may be received by the hardware comparison module at least partly overlapping in time, or within a threshold time of each other.

The hardware comparison module may comprise timeout-detection circuitry (e.g., comprising a timer or counter) for detecting if one of the first and second data is not received within a threshold time after receiving the other of the first and second data. The hardware comparison module may be configured to signal when a timeout is detected. This may enable a fault to be detected when part of the data is missing or if a denial-of-service attack is made against one of the cores. The signal may of a same type as the signal that an inconsistency is detected, or it may be distinguishable therefrom.

The hardware comparison module may be configured to signal when an inconsistency is detected and/or when a timeout is detected by sending an interrupt request (IRQ) to the first core and/or to the second core. In some examples, it may alternatively or additionally be configured to signal by setting a flag in a memory (e.g., an output register or the shared memory) that is readable by the first core and/or by the second core.

The first and second cores may have separate debug interfaces on the SoC. They may have separate RAMs on the SoC. They may be arranged to use different memory mappings.

In some examples, the SoC may comprise one or more further cores, each of which may have the first or second architecture, or a different architecture. The hardware comparison module may be configured to receive respective further data, determined by each further core, and to compare all of the received data (e.g., first, second and third data) to detect an inconsistency between the received data, and to signal when an inconsistency is detected.

Features of any example described herein may, wherever appropriate, be applied to any other example described herein. Where reference is made to different examples or sets of examples, it should be understood that these are not necessarily distinct but may overlap.

BRIEF DESCRIPTION OF THE DRAWINGS

Certain examples of the disclosure will now be described, by way of example only, with reference to the accompanying drawings in which.

DETAILED DESCRIPTION

Figure 1:
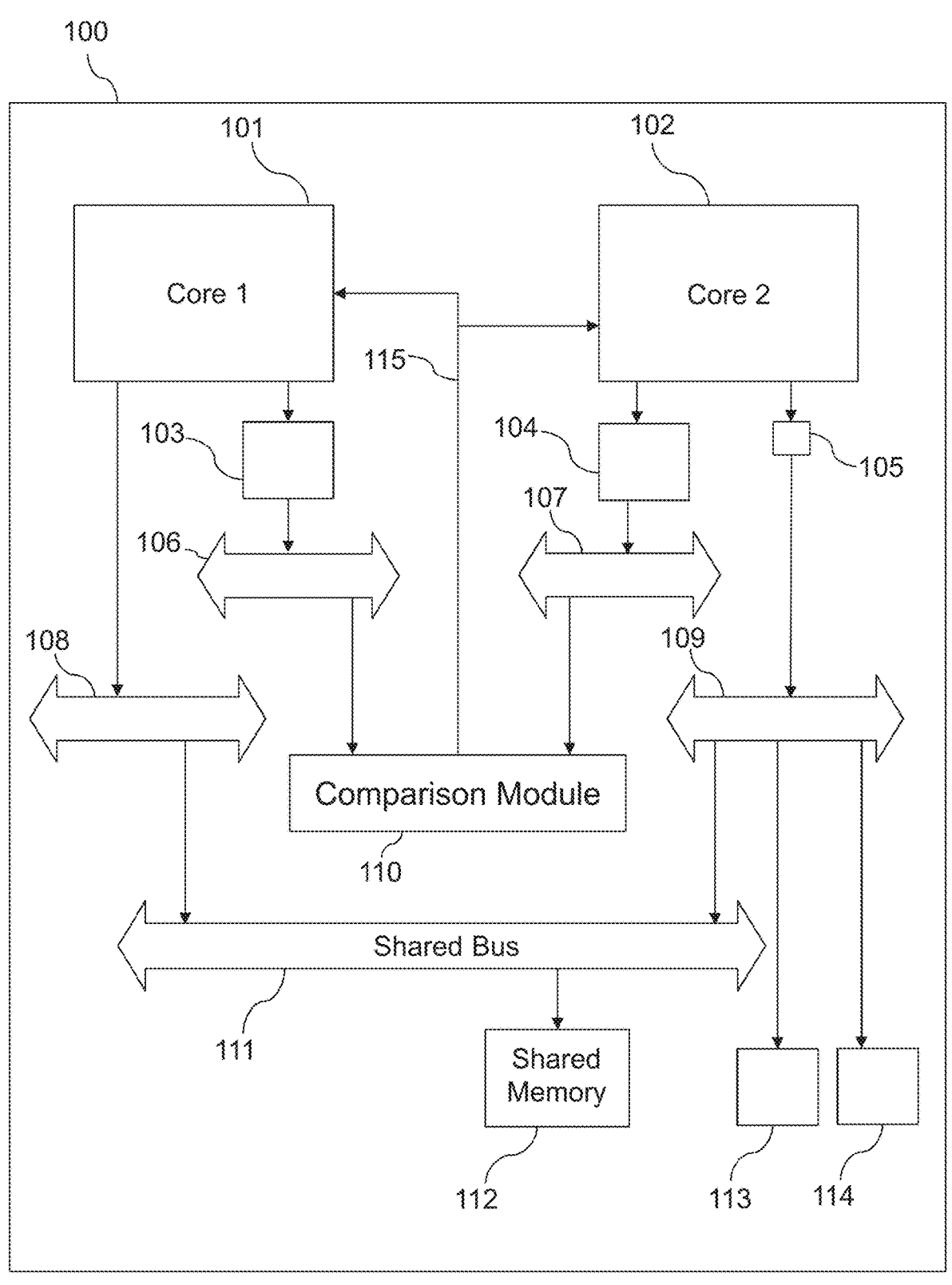
FIG. 1 is a schematic representation of the main components of a system-on-chip (SoC), in accordance with one or more embodiments of the disclosure.

FIG. 1 shows components of a system-on-chip (SoC) 100 exemplifying the disclosure. The SoC 100 is a heterogeneous dual-core architecture to perform mixed criticality application without compromising safety and security requirements. The SoC combines two dissimilar processor cores 101, 102 into a single SoC 100, which allows the system to take advantage of the benefits of both technologies, including increased reliability and improved performance.

One notable feature of this microarchitecture is its ability to provide diverse redundancy through the use of a Dual Modular Redundancy (DMR) scheme, which ensures the continued operation of the system even if one of the cores fails. Additionally, the integration of dissimilar technology provides diversity at the Instruction Set Architecture (ISA) level, the compiler level, and the core register transfer level (RTL) level, providing high resilience and low possibilities of a common-mode failure.

Furthermore, the integration of both cores into a single SoC 100 results in improved Size, Weight, and Power (SWaP), as there is no need to purchase separate components and integrate them into a motherboard, which would otherwise increase size, weight, power consumption, and—depending on the batch size—cost.

In some examples, the first core 101 has a RISC-V instruction-set architecture (ISA), while the second core 102 has an Arm instruction-set architecture. The first core 101 may be a Rocket core. The second core 102 may be an Arm core—e.g., being an Arm Cortex-MO microcontroller. In this way, the SoC 100 as a whole is able to take advantage of the benefits of both ISAs. Furthermore, since the dissimilar ISAs rely on different compilers and software binaries, any attacks which target the ISA of the first core 101 are less likely to affect the second core 102, and vice versa. In some examples, the first core 101 is a Rocket core and the SoC 100 supports a Chipyard ecosystem, with the Arm core 102 being implemented as a blackbox within this Chipyard ecosystem. Although not shown in FIG. 1, the SoC 100 has two different debug interfaces: the RISC-V core 101 is controlled externally via JTAG interface, while the Arm processor 102 has a Serial Wire Debug (SWD) interface.

In alternative examples, one or both of the first core 101 and second core 102 may have an ISA that is neither RISC-V nor Arm. The SoC 100 may, in some examples, contain one or more further cores (e.g., a third core).

In the example of FIG. 1, the RISC-V core 101 and the Arm core 102 each have their own dedicated resources to eliminate resource contention within the SoC 100, thereby ensuring time determinism for software executed by the processor cores 101, 102. In particular, each core 101, 102 has its own peripherals and its own memory mapping. However, in order to allow for parallel processing to occur in certain applications, there is also provided a shared bus 111 connected to a shared memory 112. Each processor core 101, 102 is communicatively connected to the shared bus 111 in such a way that these connections are isolated from the connections to other modules present in the SoC 100 (including the hardware comparison module 110, described in more detail below).

The SoC 100 contains respective memories for each core 101, 102 that can store software for execution by the respective cores. If suitable software is loaded onto to the SoC 100, each core 101, 102 may be programmed to perform a common set of tasks (i.e., redundantly), but will execute their computations differently according to the intricacies of their respective ISAs.

The SoC 100 may thus be effectively used in safety-critical applications such as aviation, or in security-critical applications such as banking, where the redundancy and diversity of its dual-core architecture can provide high safety against faults and/or security against malicious exploits.

To support such redundant processing, the SoC 100 provides a dedicated hardware comparison module 110 for performing comparisons between the output of each processor core 101, 102 in order to check that the outputs of each processor are consistent and to detect anomalies that might require mitigating action to be taken. In some examples, the processor cores 101, 102 send comparison data to the comparison module 110 at intervals, which may be regular or irregular, such as when particular checkpoints in the execution of software on the cores 101, 102 are reached. In other examples, the comparison module 110 could receive a constant stream of output data from the cores 101, 102, but this may be less practicable or desirable in some implementations.

To improve resilience, the processor cores 101, 102 are connected to the comparison module 110 using respective comparison-data buses 106, 107 that are isolated from each other and from three TileLink system buses 108, 109, 111, as shown in FIG. 1.

The RISC-V Rocket core 101 is connected to a RoCC-to-TL (Rocket Custom Coprocessor to TileLink) hardware accelerator module 103. This receives and responds to RISC-V commands from the RISC-V core 101 using the RoCC protocol. Its operations are described in more detail below. It decodes commands in hardware and passes data over the first comparison-data bus 106 using the TileLink protocol. This bus 106 has no connections other than to the hardware accelerator module 103 and the comparison module 110.

This arrangement whereby the hardware comparison module 110 is accessed by the RISC-V core 101 through custom hardware instructions can enhance software isolation and provide higher security.

The Arm core 102 outputs data according to the Arm Advanced Microcontroller Bus Architecture (AMBA) bus specifications, and is connected to two AHB-to-TL (Advanced High-performance Bus to TileLink) hardware bus bridge modules 104, 105. Each bridge 104, 105 is isolated from the other. These bridges 104, 105 may be capable of bridging between architectures of differing bit widths—e.g., to parse 64-bit data into 32-bit buses and vice versa. These AHB-to-TL bridges 104, 105 allow for a memory-mapping specific to the Arm core 102 to be translated to a memory-mapping which is understood by TileLink.

The comparison-data AHB-to-TL bridge module 104 is connected to a second comparison-data bus 107 which in turn is solely connected to the comparison module 110. The operations of the comparison-data bridge module 104 are described in more detail below.

The RISC-V core 101 is coupled to a first TileLink system bus 108 for accessing memories and peripherals (not shown in FIG. 1) specific to the RISC-V core 101, and also for accessing a shared TileLink system bus 111 used to access the shared memory 112. This first system bus 108 is isolated from (i.e., inaccessible to) the Arm core 102.

The second AHB-to-TL bridge 105 is connected to a second TileLink system bus 109. This second system bus 109 provides an isolated connection for the Arm core 102 to access the shared bus 111, and any of various peripherals 113, 114. These peripherals may have various functions— e.g., peripheral 113 could be a Universal Asynchronous Receiver/Transmitter (UART) port, while peripheral 114 could be a memory-mapped IO (MMIO) peripheral. These peripherals 113, 114 are accessed through the TileLink bus 109 and are therefore within the Chipyard/RISC-V ecosystem rather than being within the Arm ecosystem. However, the SoC 100 provides address translation to map between the Arm core 102 and the peripherals 113, 114 on the second system bus 109. The mapping is such that the peripherals 113, 114 do not overlap with memory address ranges used by the RISC-V core 101, thereby eliminating totally the need for shared resources, other than the comparison module 110 and the shared memory 112.

The comparison module 110 is designed to raise a flag if it detects an inconsistency between the first data and the second data received from the first and second comparison-data buses 106, 107 (which is determined in dependence on data output by the processor cores 101, 102 respectively). The comparison module 110 remains in an idle state until it receives first data from the RISC-V core 101 or second data from the Arm core 102. This data is saved into respective isolated buffers to be compared. If, before a timeout period elapses, both buffers hold the same data, as determined by the comparison module 110, then there are likely no anomalies present in the SoC 100. The flag is raised if the comparison module 110 determines that an anomaly is present, or if one of the buffers overflows (meaning one of the cores 101, 102 is malfunctioning). In practice, in some examples, this comprises the comparison module 110 sending an interrupt request (IRQ) 115 sent to each core 101,

102. The receipt of the IRQ 115 at the cores can result in the cores being instructed to perform mitigation procedures.

Figure 2:
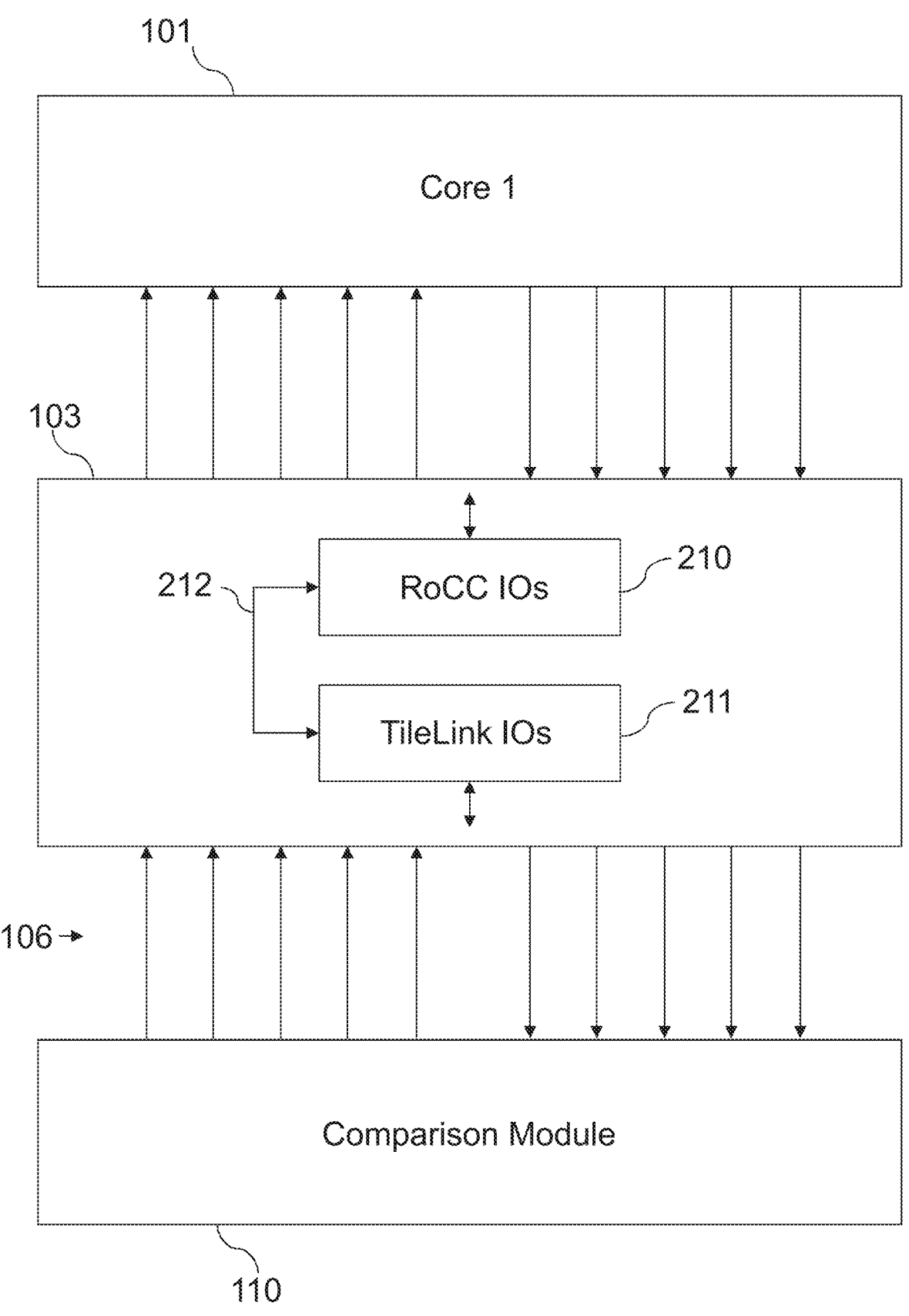
FIG. 2 is a schematic representation providing more detail of a hardware accelerator module of the SoC, in accordance with one or more embodiments of the disclosure.

FIG. 2 shows an exemplary expanded view of the RoCC-to-TL hardware accelerator module 103 and its connections with the RISC-V core 101 and the comparison module 110. In some examples, the accelerator module 103 responds to RoCC commands from the core 101, and takes raw data results of the workload from the L1 cache memory of the core 101. Raw data from the RISC-V core 101 is received into an RoCC IO (input-output) module 210, which is connected to a TileLink IO module 211 via a connection 212. This connection 212 may be provided by a Chisel module. In some examples, the connection 212 includes a hardware hashing module comprising circuitry for hashing the data moving through the hardware accelerator 103 using the SHA3 algorithm. In this way, the comparison module 110 need only deal with a relatively small amount of data, representative of the raw data from the processor core 101, rather than having to receive the full output. It also conveniently ensures the comparison module 110 receives a consistent length of data from the first core 101, which may be the same as a hash length received from the second core 102, therefore facilitating the comparison operation. In addition, passing the hashed data directly from the accelerator module 103 to the comparison module 110 ensures that the hashed data is inaccessible to the user (i.e., inaccessible to the cores 101, 102), and thus may provide a further level of obfuscation as the user never sees the hashed data. In other examples, other hardware hashing algorithms may be used, such as a different cryptographic hash, or a simpler checksum routine.

Irrespective of how or if data hashing is performed between the RoCC IO module 210 and TileLink IO module 211, the data is received by the TileLink IO module 211 and is output, as the first data, onto the isolated first comparison-data bus 106 using the TileLink protocol, directed to the comparison module 210.

The comparison-data bridge module 104 may similarly contain a hardware hashing module comprising circuitry for hashing data received from the Arm core 102 using the SHA3 algorithm, so as to generate hashed second data for outputting onto the second comparison-data bus 107.

In alternative examples, for one or both of the cores 101, 102, hashing of raw data may instead be performed in software executing on the processor core itself, although such an implementation may be less secure. In other examples, hashing could be performed by hardware within the comparison module 110. In other examples, there may be no hashing whatsoever, such that the first and second data received by the comparison module 110 are the raw data output by the cores 101, 102.

Figure 3:
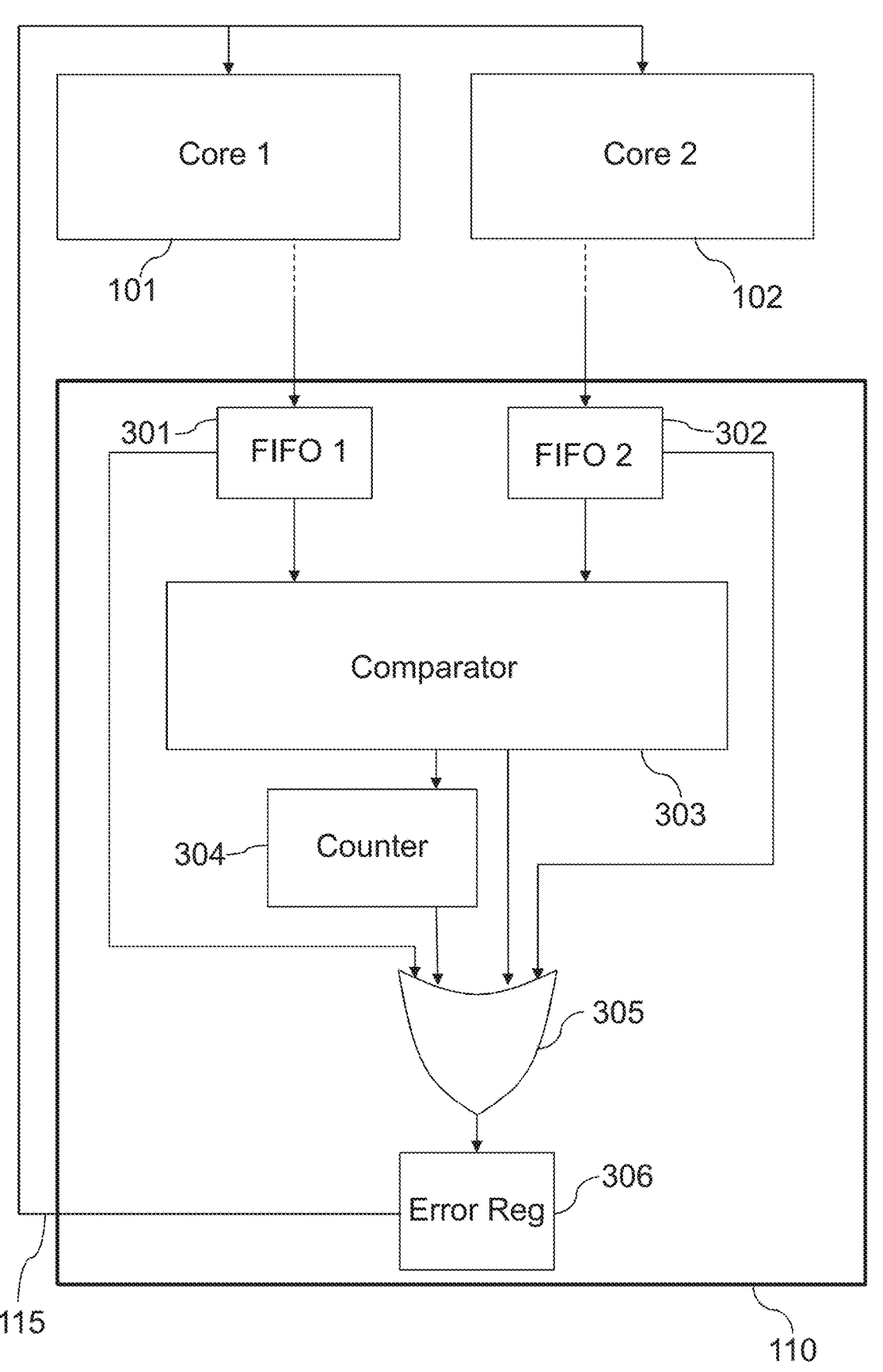
FIG. 3 is a schematic representation providing more detail of the comparison module, in accordance with one or more embodiments of the disclosure.

FIG. 3 shows an exemplary expanded view of the comparison module 110 and its connections with the processor cores 101, 102. The hardware accelerator 103, bridge 104 and comparison-data buses 106, 107 are omitted for simplicity. Within the comparison module 110 are first and second first-in-first-out (FIFO) buffers 301, 302 provided to receive the first and second data, respectively, from the RISC-V and Arm cores 101, 102 respectively. The FIFO buffers 301, 302 allow for the first and second data to be buffered before they are passed on to a hardware comparator 303. Once an expected amount of data (e.g., 256 bits of hashed data) has been received into each buffer 301, 302, the comparator 303 compares the first data with the second data in a bitwise manner.

An OR gate 305 receives an anomaly output signal from the comparator 303, which is asserted if an inconsistency is detected. When comparing hashed data, the threshold for an inconsistency may be if even a single bit differs between the first and second data.

The OR gate 305 also receives error signals from the FIFOs 301, 302 if either of them overflows.

A counter 304 begins to count clock cycles as soon as one of the FIFO buffers 301, 302 starts to receive data, after a previous comparison operation has completed. After a pre-determined number of clock cycles has elapsed without a current comparison operation completing (i.e., after a pre-determined timeout period has elapsed without corresponding data being received from the other core), a timeout error signal is output to the OR gate 305. This provision of counter 304 (i.e., a timer) allows for the SoC 100 to be resilient against denial of service attacks, or attacks which seek to disable specific cores.

If the OR gate 305 receives any of these error signals, it sets an error register flag 306 high. This causes the comparison module 110 to issue an interrupt request (IRQ) signal 115 to both of the cores 101, 102. Software executing in the cores 101, 102 can then respond by invoking appropriate interrupt routines to mitigate any possible fault or threat—e.g., to signal an alert to an operator, or take any other appropriate action.

In some variants, the SoC 100 may have a specific shared memory, shared by both cores 101, 102, that can be used as a mailbox system, and that is checked periodically by both cores 101, 102. Whenever an anomaly is detected, a message can be placed in the shared memory for software to detect and act on accordingly. Information about the type of anomaly that was detected (e.g., a FIFO buffer overflow, or a comparison anomaly, or a timeout) may be written to the shared memory, allowing the software to respond differently depending on a criticality of the anomaly.

After an anomaly has been detected by the comparison module 110, the SoC 100 may optionally implement one or more hardware mitigation policies to deal with the anomaly. These may be provided additionally or alternatively to a software-based response. In some examples, the comparison module 110 or SoC 100 more generally, may implement different behaviours according to the scenario encountered. In one example, the SoC 100 may reset one or both of the cores 101, 102 or the whole SoC 100. Alternatively, the flag 306 being raised may result in recovery policy being executed, such as a rollback, re-execution or halting of the cores 101, 102, in order to solve the anomaly behaviour.

It will be appreciated by those skilled in the art that the disclosure has been illustrated by describing several specific examples thereof, but is not limited to these examples; many variations and modifications are possible within the scope of the accompanying claims.

The invention claimed is:

1. A system-on-chip comprising:
a first core having a first processor architecture;
a second core having a second processor architecture, different from the first processor architecture;
a shared bus, communicatively coupled to the first core and to the second core;
a shared memory, communicatively coupled to the shared bus, for storing shared data accessible by the first core and by the second core over the shared bus;
a hardware comparison module comprising circuitry configured to compare first data and second data, the first data determined by one or more operations of the first core, the second data determined by one or more operations of the second core, the circuitry of the hardware comparison module configured to detect an inconsistency between the first data and the second data and to signal when an inconsistency is detected;
a first comparison-data bus communicatively coupled to the first core and to the hardware comparison module, the first comparison-data bus arranged to provide the first data to the hardware comparison module, wherein the first comparison-data bus is isolated from the shared bus;
a second comparison-data bus communicatively coupled to the second core and to the hardware comparison module, the second comparison-data bus arranged to provide the second data to the hardware comparison module, wherein the second comparison-data bus is isolated from the shared bus and from the first comparison-data bus; and
a hardware accelerator module arranged between the first core and the first comparison-data bus, the hardware accelerator module comprising circuitry configured to receive commands from the first core over a hardware-accelerator interface, the hardware accelerator module configured to output the first data onto the first comparison-data bus in response to a command from the first core received over the hardware-accelerator interface.

2. The system-on-chip of claim 1, wherein the first comparison-data bus is inaccessible to the second core and the second comparison-data bus is inaccessible to the first core.

3. The system-on-chip of claim 1, wherein the shared bus is a shared memory bus and the system-on-chip further comprises a first system bus between the first core and the shared memory bus and a second system bus between the second core and the shared memory bus, wherein the first system bus is inaccessible to the second core and the second system bus is inaccessible to the first core.

4. The system-on-chip of claim 1, further comprising a comparison-data bridge module arranged between the second core and the second comparison-data bus, wherein the comparison-data bridge module is configured to translate between a bus protocol supported by the second core and an additional bus protocol supported by the second comparison-data bus.

5. The system-on-chip of claim 4, wherein the comparison-data bridge module is arranged to pass the second data through the comparison-data bridge module.

6. The system-on-chip of claim 5, wherein the comparison-data bridge module is configured to:
receive data from the second core;
generate the second data from the received data; and
output the second data on the second comparison-data bus.

7. The system-on-chip of claim 4, wherein the comparison-data bridge module is arranged to present a memory-mapped interface to the second core.

8. The system-on-chip of claim 4, wherein the comparison-data bridge module comprises hashing circuitry configured to receive data from the second core and to hash the received data to generate the second data.

9. The system-on-chip of claim 1, wherein the hardware accelerator module is configured to retrieve data from a cache memory of the first core in response to a command from the first core received over the hardware-accelerator interface.

10. The system-on-chip of claim 1, wherein the hardware accelerator module comprises hashing circuitry configured to receive data from the first core and hash the received data to generate the first data.

11. The system-on-chip of claim 1, wherein the first data is a hash of data that has been generated by the first core and the second data is a hash of data that has been generated by the second core.

12. The system-on-chip of claim 1, wherein the hardware comparison module is configured to detect an inconsistency between the first data and the second data when at least one of the first data or a hash of the first data, differs from at least one of the second data or a hash of the second data, in more than a threshold number or a threshold percentage of bit positions.

13. The system-on-chip of claim 1, wherein the hardware comparison module comprises timeout-detection circuitry for detecting when one of the first data or the second data is not received within a threshold time after receiving the at least one of the first data or the second data.

14. The system-on-chip of claim 1, wherein the hardware comparison module is configured to signal when an inconsistency is detected by sending an interrupt request to at least one of the first core or the second core.

15. The system-on-chip of claim 1, wherein the first core has a RISC-V instruction-set architecture and the second core has an Arm instruction-set architecture.

* * * * *